United States Patent
Bach

[15] 3,659,932
[45] May 2, 1972

[54] MOTION PICTURE CAMERA WITH COUNTERBALANCING MEANS

[72] Inventor: Walter H. Bach, 1771 North Crescent Heights Boulevard, Los Angeles, Calif. 90069

[22] Filed: Oct. 5, 1970

[21] Appl. No.: 78,132

[52] U.S. Cl. ...................352/242, 352/35, 352/243
[51] Int. Cl. .......................................G03b 17/02
[58] Field of Search............352/35, 95, 242, 243, 104; 95/86

[56] References Cited

UNITED STATES PATENTS

| | | |
|---|---|---|
| 2,945,428 | 7/1960 | Dearborn....................352/243 X |
| 3,078,757 | 2/1963 | Austin et al...................352/243 X |
| 3,490,833 | 1/1970 | Gottschalk et al............352/243 X |

*Primary Examiner*—John M. Horan
*Assistant Examiner*—Alan A. Mathews
*Attorney*—Fulwider, Patton, Rieber, Lee & Utecht

[57] ABSTRACT

A camera having an elongated hollow case with a lens mount resiliently sealed in its front wall and supporting a zoom lens assembly. The lens mount is fastened to the front of a center plate supported in the front portion of the case on resilient mounts, and a counter-balancing lens stabilizer bar projects rearwardly from the center plate into a cushioned socket on the rear wall of the case.

7 Claims, 3 Drawing Figures

Patented May 2, 1972
3,659,932
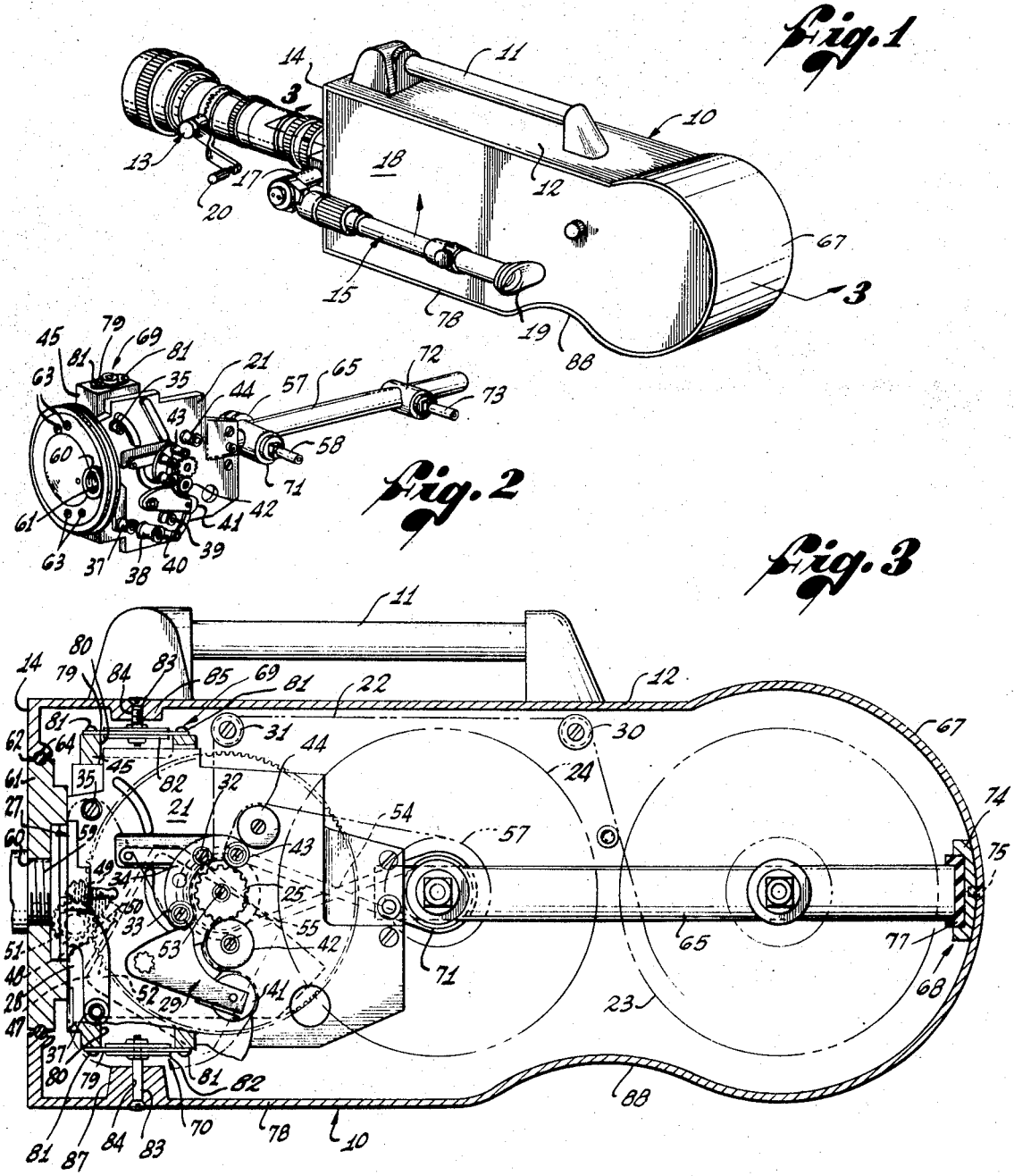
INVENTOR.
WALTER H. BACH
BY Fulwider, Patton, Rieber
Lee, and Utecht
ATTORNEYS 3,659,932

MOTION PICTURE CAMERA WITH COUNTERBALANCING MEANS

BACKGROUND OF THE INVENTION

This invention relates to motion picture cameras for photographing a motion picture sequence while simultaneously recording a sound track for accompanying the motion picture, and has particular reference to a portable camera.

While such cameras may be used for various purposes, an area of particular utility is field photography such as news photography in which convenience of handling and durability are very important characteristics. Thus, such cameras should be as light in weight and as well balanced as possible while being rugged and compact in construction.

In addition, it is important to minimize the noise produced by the working mechanisms of the camera, and to avoid transmitting such noise to the sound equipment used in close association with the camera. For this purpose, the internal camera mechanisms may be mounted on resilient cushioning elements for damping out noise-producing vibrations and preventing the transmission of such vibrations through the case or body of the camera to the sound equipment.

A factor which complicates the design of a lightweight, durable and easily handled camera of the foregoing type is the use of a so-called zoom lens with which the subject can be made to appear to come rapidly closer to, or to move rapidly away from, the camera. Such lenses comprise elongated assemblies of substantial weight which are mountable on the front of the camera in outwardly projecting relation with the front wall.

Such a lens overbalances a conventional camera to the front, making it cumbersome to handle, and when mounted directly on the front of the internal support for the camera mechanisms, can put an excessive amount of stress on the resilient cushioning mounts in the case.

SUMMARY OF THE INVENTION

The present invention resides in a new and improved motion picture camera of the foregoing general character which is particularly designed for use with an elongated zoom lens assembly and sound-recording equipment, but without the weight balancing, handling and support problems that are inherent in conventional cameras that are so equipped. More specifically, the invention resides in a sound motion picture camera having a lightweight case containing the usual working mechanisms of such cameras, and capable of supporting a zoom lens assembly in a novel manner without adversely affecting the balance or vibration-cushioning characteristics of the camera.

In the preferred embodiment shown and described herein, the camera case is a hollow body that is elongated in a front-to-rear direction, the front wall having a mount therein for the zoom lens assembly, and the working mechanisms are mounted in a conventional manner on a support in the form of a center plate behind the front wall and connected to the lens assembly. Projecting rearwardly from the center plate is an elongated lens stabilizer member which counterbalances the weight of the lens assembly and which is supported at its rear end on the rear wall of the body through a resilient, cushioning connection. Spindles for the usual film-supply and take-up spools are longitudinally spaced along the stabilizer member behind the center plate to add the weight of the spools to the stabilizer member.

To complete the support of the center plate on the body, resilient cushioning mounts are provided on at least two oppositely disposed sides of the center plate, preferably above and below the plate. Thus, the entire internal subassembly is supported in the body on the center plate mounts and the connection between the stabilizer member and the rear wall, with the lens mount carried on the front of this subassembly and the lens assembly cantilevered on the lens mount and projecting outwardly through an opening in the front wall. The result is a lightweight, rugged and well-balanced camera that is easily handled in use and in which noise-producing vibrations are effectively damped to eliminate camera noise on the sound track.

Other objects and advantages will become apparent from the following detailed description, taken in conjunction with the accompanying drawings.

BRIEF DESCRIPTION OF THE DRAWINGS

FIG. 1 is a perspective view of a sound motion picture camera embodying the novel features of the present invention and equipped with a zoom lens assembly;

FIG. 2 is a perspective view of the internal subassembly of the camera in FIG. 1, including the center plate, the basic working mechanisms of the camera, a lens stabilizer member, and a lens mount; and FIG. 3 is an enlarged fragmentary, longitudinal cross-sectional view taken substantially along the line 3—3 of FIG. 1.

DETAILED DESCRIPTION

As shown on the drawings for purposes of illustration, the invention is embodied in a sound motion picture camera of a type designed primarily as a portable unit adapted to be carried on the shoulder of the operator during use in the field, as well as to be supported on a tripod or dolly (not shown). The camera is housed in a hollow body 10 forming a case having a carrying handle 11 on its upper side 12, and is shown in FIG. 1 as having an elongated zoom lens assembly 13 projecting forwardly from its front side 14.

The usual eye-piece 15 extends laterally to one side at 17 from the lens assembly 13 adjacent the front side of the camera, and then rearwardly along one side wall 18 of the case to a shaped shield 19 through which the operator sights the camera on the subject. A crank 20 adjacent the outer or forward end of the lens assembly is used to adjust the lens.

The film-handling and sound-recording elements of the camera are mounted primarily on a support 21 (FIGS. 2 and 3) in the form of a center plate disposed adjacent the front side of the case in a normally vertical plane. On one side of the center plate, the side shown in FIGS. 2 and 3, are a plurality of rollers which guide the film to be exposed along a path, indicated at 22, from a feed or supply spool 23 (FIG. 3) supported behind the center plate, across the top of a take-up spool 24, and then downwardly across the front side of a sprocket 25, from which the film loops upwardly before passing the usual film gate at 27 and an intermittent claw shown generally at 28. Then the film loops downwardly, is guided past a sound-recording unit 29, and then moves along the rear side of the sprocket 25 and onto the take-up spool 24.

The illustrative guide rollers determining this path include two rollers 30 and 31 (FIG. 3) on the inside of the case 10 for guiding the unexposed film across the top of the take-up spool 24, two rollers 32 and 33 (FIGS. 2 and 3) mounted on an arcuate lever 34 to hold the film in engagement with the front of the sprocket 25, and two rollers 35 and 37 above and below the film gate 27. Three rollers 38 through 40 (FIG. 2) guide the exposed film from the roller 37 to the recording unit 29, which has a guide roller 41 around which the film passes in approaching the recording position. A pressure roller 42 holds the film against the recording unit as it passes. Beyond the recording unit and the sprocket 25 are two rollers 43 and 44 which hold the film in engagement with the rear side of the sprocket and then guide the film onto the take-up spool 24.

On the opposite side of the center plate from the foregoing elements is a mounting block 45 for supporting a drive motor 47 for operating the camera mechanisms, the motor being shown in broken lines in FIG. 3 and having a forwardly and upwardly inclined output shaft 48 carrying a worm 49 which meshes with and drives a worm wheel 50 to rotate a coaxial pinion gear 51. This gear operates the intermittent claw 28 for feeding the film step by step through the film gate 27 in the usual manner, and also meshes with a larger gear 52 on a common shaft 53 with the sprocket 25 so that the unexposed film is fed toward the film gate around the front side of the sprocket while exposed film is drawn away from the film gate across the rear side of the sprocket, both in timed relation with the operation of the intermittent claw for stepping the film through the film gate. A figure-eight-shaped spring belt 54 is wrapped around pulleys 55 and 57 on the sprocket shaft and on a spindle 58 supporting the take-up spool 24 to drive the latter, slipping as required to vary the take-up speed.

It should be emphasized that the foregoing film-handling and sound-recording elements are basically conventional in construction and arrangement, and are described only generally herein to provide a better understanding of the associated features of the invention. An example of a suitable sound-recording device is that sold by Bach Auricon, Inc. under the trademark "Filmagnetic", which operates with an external microphone (not shown) for picking up accompanying sounds and converting the sounds to signals for actuating the recording device. A suitable drive motor is an electric motor having an output speed on the order of 1800 RPM, reduced to 1440 RPM at the pinion gear 51 and to 180 RPM at the sprocket 25.

Similarly, the zoom lens assembly 13, shown herein for purposes of illustration, may be of conventional construction. As can be seen in FIG. 3, the illustrative lens has a threaded fitting 59 on its rear end which threads into a tapped hole 60 in a disk-like lens mount 61 fitted loosely in an opening 62 in the front wall 14 of the camera, and fastened to the front end of the center plate 21 by screws 63 (FIG. 2) which herein thread into the front of the mounting block 45. The lens mount may be a single lens mount, as shown herein, or may be a lens turret (not shown). A resilient O-ring seal 64 between the lens mount and the front wall seals the clearance around the lens mount against the entry of light and foreign matter into the case 10.

With the foregoing arrangement, it will be seen that the lens assembly 13 is supported on the front end of the center plate 21. Thus, the substantial weight and length of the assembly, cantilevered on the center plate, result in a considerable tilting moment applied to the center plate and, of course, to the camera as a whole.

To avoid the necessity of using a relatively heavy and cumbersome case 10 having a thick or reinforced front wall 14 and sufficiently rigid internal bracing to sustain this tilting moment, the present invention contemplates the mounting of an elongated lens stabilizer member, herein an elongated bar 65, on the rear side of the center plate 21 in rearwardly projecting relation therewith, to counterbalance the zoom lens assembly 13 and thereby eliminate the tilting moment previously mentioned. The supply and take-up spools 23 and 24 are mounted on this bar behind the center plate, and the rear end of the bar is joined to the rear wall 67 of the case by a cushioning connection 68 which immobilizes the bar while damping out internal vibrations that otherwise could be transmitted to the case as noise-producing vibrations.

Completing the mounting of the center plate 21 in the case 10 are at least two resilient mounts 69 and 70 on oppositely disposed sides of the center plate, herein above and below the latter. These mounts hold the center plate in spaced relation with the case, and cooperate with the rear connection 68 in insuring that the entire internal subassembly is firmly supported in effectively cushioned relation within the case.

As can be seen in FIGS. 2 and 3, the lens stabilizer bar 65 is substantially level and coaxial with the lens assembly 13, and its front end overlaps, and is suitably secured to, the rear edge portion of the center plate 21. Immediately behind the center plate is a transverse bearing housing 71 in which the spindle 58 for the take-up spool 24 is journaled, the pulley 57 being fast on the spindle on one side of the bar and the spindle having a laterally projecting end portion on the other side for telescoping into and supporting the take-up spool, as indicated in FIG. 3.

A similar bearing housing 72 is provided on the stabilizer bar 65 adjacent its rear end, far enough forward from the connection 68 to provide clearance between the feed spool 23 and the rear wall 67 of the case, and far enough behind the take-up spool 24 to provide clearance between the two spools. A spindle 73 projects laterally out of this housing on the same side of the stabilizer bar as the free end portion of the spindle 58, to telescope into and support the feed spool 23, as indicated in FIG. 3.

In this instance, the rear connection 68 has a forwardly opening socket formed by a mounting cup 74 held on the inner side of the rear wall by a screw 75, and a cup-shaped cushion 77 of rubber or other suitably resilient material into which the free end of the stabilizer bar projects with a snug fit. Accordingly, the rear end of the bar is firmly but resiliently attached to the rear wall of the case.

The mounts 69 and 70 for holding the center plate 21 properly positioned in the case 10 preferably herein are connected between the top and bottom walls 12 and 78 of the case and the adjacent ends of the mounting block 45 on the center plate. As shown most clearly in FIG. 3, each mount includes a mounting plate 79 of slightly elongated, oval shape overlying a recess 80 in the associated end of the block 45, and is held in place by screws 81 threaded into the block. A web 82 composed of rubber or other suitably resilient material is fast in a center hole (not shown) in the mounting plate in overlying relation with the recess 80 in the block.

A shouldered screw 83 is threaded into a tapped hole 84 in a boss 85, 87 on the adjacent wall 12, 78 of the case, and the inner stud-like end of each screw, beyond the shoulder thereon, projects through a center hole in the rubber web toward the bottom of the recess 80. Both above and below the mounting block, the shoulders of the screws abut tightly against the rubber webs, and the ends of the screws are spaced from the bottoms of the recesses.

Thus, the screws 83 and the rubber webs 82 cooperate to suspend the center plate 21 resiliently in the case. The webs are thicker than the plates, and will abut against the associated boss 85, 87 to provide a cushioned stop against excessive displacement of the center plate in either direction. The ends of the screws also positively limit displacement of the center plate both upwardly and downwardly in the case, and cooperate with the side walls of the recesses 80 to limit lateral displacement.

It will be seen in FIGS. 1 and 3 that the case 10 for enclosing the foregoing camera structure is elongated in a front-to-rear direction, having a box-like front portion and a generally cylindrical enlargement at its rear end following the curvature of the feed spool 23. This case may be made of relatively thin and lightweight material such as 1/16 inch cast aluminum, since the internal subassembly is well balanced within the case and its weight, and the weight of the lens assembly 13, are distributed so that the case does not need great structural strength. One sidewall of the case preferably is a removable side plate for convenient access to the interior.

The normal manner of supporting the camera in the field is on the shoulder of the operator, and a concavely curved indentation 88 in the underside of the case, generally between the two spools 23 and 24, provides an abutment serving to indicate the forward limit of sliding of the camera along the operator's shoulder. The center of gravity of the camera and lens combination is in front of this indentation, so the camera is handled most conveniently when the flat lower side 78 in front of the recess is resting on the operator's shoulder.

From the foregoing, it should be apparent that the camera constituting the present invention is well suited for use with an elongated zoom lens assembly and supports the lens assembly securely on the front side of the camera in counterbalanced relation so as to minimize or eliminate the tilting moments that otherwise would result. Accordingly, it is practical to form the case of very lightweight material and also to support the working mechanism of the camera, and the lens assembly, with effective vibration-damping material.

It also will be apparent that, while a particular form of the invention has been illustrated and described, variations may

What is claimed is:

1. A sound motion picture camera having, in combination:
a body having front, rear, top and bottom sides and defining a hollow interior that is elongated in a front-to-rear direction, said front side having an opening therein;
a lens mount disposed in said opening with a clearance fit;
an elongated lens assembly attached at one end to said lens mount and projecting outwardly therefrom in front of said body;
a support inside said body adjacent said front side fastened to said lens mount and having film handling means thereon;
an elongated lens stabilizer bar secured to said support and projecting rearwardly therefrom inside said body to counterbalance the weight of said lens assembly;
means on said bar behind said support for rotatably supporting film supply and take-up spools on said bar;
a socket inside said body on the rear side thereof having a resilient cushioning element receiving and supporting the rear end of said bar;
a first resilient mount between said top side and said support holding the latter in spaced relation with said top side;
a second resilient mount between said bottom side and said support holding the latter in spaced relation with said bottom side;
and a resilient seal closing the clearance between said lens mount and said front side.

2. A sound motion picture camera as defined in claim 1 in which said body is composed of lightweight sheet material, and said support is a center plate disposed in a normally vertical plane having a front edge fastened to said lens mount and a rear edge fastened to said bar.

3. A sound motion picture camera as defined in claim 1 in which said socket is defined by a mounting cup on said rear wall and said cushioning element is a cup-shaped cushion in said mounting cup.

4. A sound motion picture camera as defined in claim 1 in which said body has an indentation in its bottom side adjacent said rear side forming an abutment.

5. A sound motion picture camera as defined in claim 1 in which said resilient mounts have means thereon for limiting upward and downward displacement of said support.

6. A sound motion picture camera having, in combination:
a lightweight body having front, rear, top and bottom sides and a hollow interior that is elongated in a front-to-rear direction;
means adjacent said front side for supporting an elongated lens assembly in outwardly projecting, cantilevered relation on said body, said supporting means including a lens mount adjacent said front side;
a support inside said body adjacent said front side in spaced relation with said body and having film handling and sound recording means thereon, said support being fastened to said lens mount;
an elongated lens stabilizer bar secured to said support and projecting rearwardly therefrom inside said body to counterbalance the weight of the lens assembly;
means spaced longitudinally along said lens stabilizer bar for rotatably supporting film supply and take-up spools in longitudinally spaced relation;
a connection between said rear side and the rear end of said lens stabilizer bar, including resilient means cushioning said bar against the transmission of vibration to said body;
and means mounting said support in said body from said top and bottom sides thereof, and cushioning said support against the transmission of vibration to said body.

7. A motion picture camera having, in combination:
a body having a front side and a hollow interior;
means for supporting an elongated lens assembly in outwardly projecting, cantilevered relation with said front side and including a lens mount adjacent said front side;
a support inside said body adjacent said front side having film handling means thereon, said support carrying said lens mount on the side of the support adjacent said front side;
an elongated lens stabilizer member secured to said support and projecting rearwardly therefrom inside said body to counterbalance the weight of the lens assembly;
means on said lens stabilizer member for rotatably supporting film supply and take-up spools thereon;
means on said body supporting the end of said lens stabilizer member remote from said support and resiliently cushioning said member;
and means mounting said support in said body from at least two oppositely disposed sides of the support and resiliently cushioning said support in said body.

* * * * *